United States Patent [19]

Ohara et al.

[11] 3,907,712

[45] Sept. 23, 1975

[54] CATALYST COMPOSITION FOR THE PREPARATION OF UNSATURATED CARBONYL COMPOUNDS

[75] Inventors: Takashi Ohara; Michio Ueshima, both of Nishinomiya; Isao Yanagisawa, Ikeda, all of Japan

[73] Assignee: Nippon Shokubai Kagaku Kogyo Co., Ltd., Osaka, Japan

[22] Filed: Feb. 19, 1974

[21] Appl. No.: 443,745

Related U.S. Application Data

[60] Continuation-in-part of Ser. No. 399,517, is a division of Ser. No. 146,848, May 19, 1971, Pat. No. 3,825,600.

[30] Foreign Application Priority Data

May 26, 1970   Japan................................ 45-44531

[52] U.S. Cl. ................ 252/456; 252/458; 252/464; 252/470

[51] Int. Cl.² ...................... B01J 21/08; B01J 23/30
[58] Field of Search ............................ 252/456, 458

[56] References Cited

UNITED STATES PATENTS 3,679,603   7/1972   Garnish et al. ................. 252/456 X Primary Examiner—W. J. Shine
Attorney, Agent, or Firm—Sherman & Shalloway

[57] ABSTRACT

A catalyst composition consisting essentially of the metallic elements Co, Fe, Bi, W, Mo, Si and Z in which the atomic ratio among metallic elements, Co:Fe:Bi:W:Mo:Si:Z is within the range of 2.0–20.0:0.1–10.0:0.1–10.0:0.5–10.0:2.0–11.5:0.5–15.0:0.005–1.0, with the proviso that W plus Mo equals 12.0, and Z represents an alkali metal.

3 Claims, No Drawings

CATALYST COMPOSITION FOR THE PREPARATION OF UNSATURATED CARBONYL COMPOUNDS

This application is a continuation-in-part of application Ser. No. 399,517 filed on Sept. 21, 1973, now abandoned, which was a divisional application of Ser. No. 146,848, filed on May 19, 1971 now U.S. Pat. No. 3,825,600.

This invention relates to a process for the preparation of unsaturated carbonyl compounds from olefins. More particularly, the invention relates to a catalytic vapor phase oxidation of propylene or isobutylene to make the corresponding unsaturated carbonyl compound, i.e., acrolein or methacrolein respectively.

In the industrial scale production of unsaturated carbonyl compounds by the catalytic vapor phase oxidation of the corresponding olefins, it is generally true that the use of a catalyst which gives high conversion of olefins and shows high selectivity for the desired unsaturated carbonyl compound is particularly important.

As the catalyst conventionally employed in the preparation of acrolein or methacrolein by the catalytic vapor phase oxidation of propylene or isobutylene, respectively, catalytic oxides composed of molybednum, tellurium, cadmium or zinc, and oxygen are recommended, for example, by the prior art disclosed in Japanese Official Patent Gazette, Publication No. 10605/68. Also the same Gazette, Publication No. 6245/69 teaches the use of a catalytic oxide composed of nickel, cobalt, iron, bismuth, molybdenum, phosphorus and oxygen. However, the per-pass yield of the unsaturated carbonyl compound obtained through the action of those known catalysts is industrially unsatisfactory.

Accordingly, the object of the invention is to provide a process for making unsaturated carbonyl compounds with industrial advantages, which employs a novel catalyst system.

It has been discovered that the above object of the invention can be accomplished by the use of a catalytic oxide which comprises cobalt, iron, bismuth, tungsten, molybdenum, silicon, an alkali metal and oxygen, since in the presence of such catalyst acrolein or methacrolein is obtained from propylene or isobutylene, respectively, with very high per-pass yield.

The catalyst or catalytic oxide of the invention is characterized in that the metallic elements constituting the same are present in the following atomic ratios: Co:Fe:Bi:W:Mo:Si:Z = 2.0–20.0:0.1–10.0:0.1–10.0:0.5–10.0:2.0–11.5:0.5–15.0:0.005–1.0, preferably 2.0–10.0:0.1–10.0:0.1–7.0:0.5–5.0:7.0–11.5:0–.5–7.0:0.005–1.0 and more preferably 2.0–10.0:0.1–5.0:0.1–5.0:0.5–5.0:7.0–11.5:0.5–7.0:0.01–0.5 (provided that W + Mo = 12.0, and Z stands for an alkali metal, i.e., Li, Na, K, Rb or Cs.) Presumably, the oxygen is present in the catalyst in the form of complex metal oxide or metallic acid salt. Consequently, the oxygen content of the catalyst varies depending on the atomic ratios of the metallic elements constituting the catalyst.

The catalyst of the invention can be prepared through the steps of, for example, mixing an aqueous solution of ammonium molybdate and ammonium p-tungstate, adding to the mixture aqueous solutions of cobalt nitrate, iron nitrate, and bismuth nitrate, further adding thereto an aqueous solution of a hydroxide or carbonate of an alkali metal and subsequently colloidal silica as the silicon source, concentrating the system by evaporation, molding the resulting clay-like substance and calcining the same at temperatures between 350°–600°C., in an air current. Obviously, the starting materials of the catalyst are not limited to the ammonium salt, nitrate, hydroxide and carbonate as above, but other various compounds are equally useful as long as they can form the catalytic oxide upon calcination.

As the carrier, for example, silica gel, alumina, silicon carbide, diatomaceous earth, titanium oxide and 'celite', etc. may be employed, particularly preferred carriers being silica gel, titanium oxide and 'celite'.

The catalytic vapor phase oxidation in accordance with the invention is performed by introducing a gaseous mixture composed of 1–10 vol. % of propylene or isobutylene, 5–15 vol. % of molecular oxygen, 20–60 vol. % of steam and 20–50 vol. % of an inert gas, onto the catalyst prepared as above, at temperatures ranging from 250°–450°C. and pressure ranging from the normal pressure to 10 atmospheres. Suitable contact time ranges from 1.0 to 10.0 seconds. The reaction can be carried out either with a fixed bed or fluidized bed. Through the above-specified operation, results such as 92–100 mol % conversion of propylene or isobutylene, 90–93 mol % selectivity for acrolein and 80–87 mol % selectivity for methacrolein can be obtained. Such results are markedly superior to those of the prior art.

Although the subject invention is not tied by the basic concept, the excellent results of the subject process are presumably due to the appropriate adjustment of catalytic ability accomplished by the concurrent presence, in the catalytic oxide of the invention, of molybdate and tungstate of cobalt, iron, and bismuth, with oxides; presence of heteropolyacid compound containing silicon and alkali metal; etc. This presumption is substantiated by the facts that the selectivities are markedly improved by the presence of alkali metal, and that the conversion is improved by the presence of silicon, while retaining the high level of selectivities, as demonstrated in the later appearing Example 1 and Controls 1 and 2.

The terms, conversion, selectivity, and per-pass yield, are used in this specification with the definitions below.

$$\text{Conversion (\%)} = \frac{\text{Mol number of reacted olefin}}{\text{Mol number of supplied olefin}} \times 100$$

$$\text{Selectivity (\%)} = \frac{\text{Mol number of formed unsaturated carbonyl compound}}{\text{Mol number of reacted olefin}} \times 100$$

$$\text{Per-pass yield (\%)} = \frac{\text{Mol number of formed unsaturated carbonyl compound}}{\text{Mol number of supplied olefin}} \times 100$$

Hereinafter the invention will be more fully explained with reference to working examples and controls, it being understood that the scope of this invention is by no means thereby restricted.

EXAMPLE 1

Seventy (70.0) g of cobalt nitrate were dissolved in 20 ml of distilled water. Also 24.3 g of ferric nitrate were dissolved in 20 ml of distilled water, and 29.2 g of bismuth nitrate, in 30 ml of distilled water which was made acidic with 6 ml of conc. nitric acid. Separately, into 150 ml of water, 106.2 g of ammonium molybdate and 32.4 g of ammonium p-tungstate were dissolved under heating and stirring. The foregoing three aqueous solutions of nitrates were dropped into the aqueous ammonium salts solution, and further an aqueous solution formed by dissolving 0.202 g of potassium hydroxide in 15 ml of distilled water and 24.4 g of 20% silica-sol were added thereto. The suspension was heated under stirring to cause evaporation of the liquid component. The resulting solid was molded and calcined at 450°C. for 6 hours in an air current to form the catalyst.

The metallic composition of the catalyst was as below, in terms of atomic ratio:

$$Co_4 Fe_1 Bi_1 W_2 Mo_{10} Si_{1.35} K_{0.06}.$$

Sixty ml of the catalyst were packed in a stainless steel U-shaped tube of 20 mm in diameter. The tube was immersed in a molten nitrate bath heated at 320°C., and through the same tube a gaseous mixture composed of 4 vol. % of propylene, 51 vol. % of air and 45 vol. % of steam was passed to be reacted with the contact time of 2.7 seconds. The results were as shown in Table 1.

Control 1

Example 1 was repeated except that the addition of silica-sol was omitted. The metallic composition of the resulting catalyst was as follows in terms of atomic ratio:

$$Co_4 Fe_1 Bi_1 W_2 Mo_{10} K_{0.06}.$$

This catalyst was used in the reaction of Example 1, with the results as shown also in Table 1.

Control 2

Example 1 was repeated except that the use of potassium hydroxide was omitted. The metallic composition of the catalyst was as follows, in terms of atomic ratio:

$$Co_4 Fe_1 Bi_1 W_2 Mo_{10} Si_{1.35}.$$

The catalyst was used in the reaction of Example 1, with the results as given in Table 1.

Table 1

| | Composition of catalyst (atomic ratio) | | | | | | | Reaction temperature (°C.) | Propylene conversion (mol %) | Selectivity (mol %) | | Per-pass yield (mol %) | |
|---|---|---|---|---|---|---|---|---|---|---|---|---|---|
| | Co | Fe | Bi | W | Mo | Si | K | | | Acrolein | Acrylic acid | Acrolein | Acrylic acid |
| Example 1 | 4 | 1 | 1 | 2 | 10 | 1.35 | 0.06 | 320 | 97.0 | 93.0 | 6.1 | 90.2 | 6.0 |
| Control 1 | 4 | 1 | 1 | 2 | 10 | — | 0.06 | 320 | 86.4 | 92.5 | 4.7 | 79.9 | 4.1 |
| Control 2 | 4 | 1 | 1 | 2 | 10 | 1.35 | — | 320 | 94.5 | 71.5 | 11.4 | 67.5 | 10.7 |

EXAMPLES 2–3

The catalyst was prepared in accordance with Example 1. Example 1, using this catalyst, was repeated except that the contact time and the composition of gaseous mixture were changed. The results were as shown in Table 2.

Table 2

| | Reaction temperature (°C.) | Contact time (sec) | Composition of gaseous mixture (mol %) | | | Propylene conversion (mol %) | Selectivity (mol %) | | Per-pass yield (mol %) | |
|---|---|---|---|---|---|---|---|---|---|---|
| | | | Propylene | Steam | Air | | Acrolein | Acrylic acid | Acrolein | Acrylic acid |
| Example 2 | 325 | 1.8 | 4 | 45 | 51 | 96.5 | 93.0 | 5.5 | 89.7 | 5.3 |
| Example 3 | 325 | 1.8 | 7 | 30 | 63 | 96.0 | 90.0 | 7.1 | 86.4 | 6.8 |

EXAMPLES 4–20

Catalyst of the compositions specified in Table 3 were prepared in the manner similar to catalyst preparation in Example 1. Propylene was oxidized in the presence of those catalysts, similarly to Example 1, at the indicated reaction temperatures, with the results as shown in Table 3. Note that in Example 14, 20 wt. % to the catalyst of silica gel, and in Example 18, 30 wt. % to the catalyst of titanium oxide, were used as the carriers, respectively.

Table 3

| Ex. No. | Composition of catalyst (atomic ratio) | | | | | | | | | | Reaction temperature (°C.) | Propylene conversion (mol %) | Selectivity (mol %) | | Per-pass yield (mol %) | |
|---|---|---|---|---|---|---|---|---|---|---|---|---|---|---|---|---|
| | Co | Fe | Bi | W | Mo | Si | K | Na | Li | Cs | | | Acrolein | Acrylic acid | Acrolein | Acrylic acid |
| 4 | 5 | 0.2 | 1.75 | 1 | 11 | 1.35 | 0.06 | — | — | — | 320 | 97.5 | 91.0 | 7.0 | 88.7 | 6.8 |
| 5 | 8 | 1.5 | 1.5 | 2 | 10 | 0.8 | 0.08 | — | — | — | 320 | 98.0 | 90.0 | 6.8 | 88.2 | 6.7 |
| 6 | 4 | 3 | 0.4 | 1.5 | 10.5 | 1.35 | 0.06 | — | — | — | 330 | 96.0 | 90.2 | 5.8 | 86.6 | 5.6 |
| 7 | 6 | 0.5 | 3 | 2 | 10 | 3.5 | 0.06 | — | — | — | 340 | 97.0 | 91.5 | 5.4 | 88.8 | 5.2 |
| 8 | 4 | 1 | 1 | 0.5 | 11.5 | 5.2 | 0.08 | — | — | — | 320 | 96.8 | 90.5 | 6.0 | 87.6 | 5.8 |
| 9 | 3 | 1 | 1 | 2 | 10 | 1.35 | 0.02 | — | — | — | 340 | 95.0 | 90.6 | 7.1 | 86.0 | 6.7 |
| 10 | 6 | 1 | 1 | 2 | 10 | 1.35 | 0.08 | — | — | — | 320 | 96.8 | 90.2 | 5.3 | 87.2 | 5.1 |
| 11 | 4 | 0.5 | 1 | 2 | 10 | 1.5 | 0.06 | — | — | — | 320 | 97.8 | 90.7 | 6.9 | 88.8 | 6.7 |
| 12 | 4 | 2 | 0.5 | 2 | 10 | 2.0 | 0.06 | — | — | — | 320 | 94.0 | 90.8 | 6.0 | 85.4 | 5.6 |
| 13 | 4 | 1 | 1 | 4 | 8 | 3.0 | 0.08 | — | — | — | 350 | 94.8 | 92.6 | 5.2 | 87.8 | 4.9 |
| 14 | 4 | 1 | 1 | 2 | 10 | 1.35 | 0.06 | — | — | — | 320 | 96.8 | 91.7 | 6.6 | 88.7 | 6.4 |
| 15 | 4 | 1 | 1 | 2 | 10 | 1.5 | 0.08 | — | — | — | 330 | 96.5 | 92.4 | 5.8 | 89.2 | 5.6 |
| 16 | 4 | 1 | 1 | 2 | 10 | 1.35 | — | 0.02 | — | — | 320 | 96.2 | 90.5 | 6.9 | 87.1 | 6.6 |
| 17 | 4 | 1 | 1 | 3 | 9 | 1.35 | — | 0.1 | — | — | 320 | 94.8 | 92.2 | 5.4 | 87.3 | 5.1 |
| 18 | 4 | 1 | 1 | 2 | 10 | 1.35 | — | — | 0.02 | — | 340 | 95.5 | 90.8 | 6.2 | 86.7 | 5.9 |
| 19 | 4 | 1 | 1 | 2 | 10 | 1.35 | — | — | — | 0.02 | 350 | 96.5 | 91.1 | 6.4 | 87.9 | 6.2 |
| 20 | 4 | 1 | 1 | 2 | 10 | 1.35 | 0.06 | 0.1 | — | — | 340 | 96.4 | 92.0 | 5.1 | 88.7 | 4.9 |

EXAMPLES 21–27

Catalysts of various compositions as shown in Table 4 were prepared similarly to Example 1.

Sixty ml of each catalyst were packed in a stainless steel U-shaped tube of 20 mm in diameter, and through the tube immersed in molten nitrate bath of the temperature indicated in Table 4, a gaseous mixture composed of 4 vol. % of isobutylene, 51 vol. % of air, and 45 vol. % of steam was passed to be reacted, with the contact time of 2.0 seconds. The results were as shown in Table 4.

What we claim is:

1. A catalyst composition consisting essentially of a catalytic complex metal oxide consisting essentially of oxygen and the metallic elements Co, Fe, Bi, W, Mo, Si and Z in which the atomic ratio among said metallic elements, Co:Fe:Bi:W:Mo:Si:Z is within the range of 2.0–20.0:0.1–10.0:0.1–10.0:0.5–10.0:2.0–11.5:0-.5–15.0:0.005–1.0, with the proviso that W plus Mo equals 12.0, and Z represents an alkali metal.

2. The catalyst composition of claim 1 wherein the atomic ratio among said metallic elements Co:Fe:Bi:W:Mo:Si:Z is within the range of 2.0–10.0:0.1–10.0:0.1–7.0:0.5–5.0:7.0–11.5:0.5–7.0:0.005–1.0.

3. The catalyst composition of claim 1 wherein the atomic ratio among said metallic elements Co:Fe:Bi:W:Mo:Si:Z is within the range of 2.0–10.0:0.1–5.0:0.1–5.0:0.5–5.0:7.0–11.5:0.5–7.0:0.01–0.5.

Table 4

| Example No. | Co | Fe | Bi | W | Mo | Si | K | Na | Li | Cs | Reaction temperature (°C.) | Isobutylene conversion (mol %) | Methacrolein selectivity (mol %) | Methacrolein per-pass yield (mol %) |
|---|---|---|---|---|---|---|---|---|---|---|---|---|---|---|
| 21 | 4 | 1 | 1 | 2 | 10 | 1.35 | 0.2 | — | — | — | 340 | 92.0 | 82.1 | 75.5 |
| 22 | 4 | 1 | 1 | 2 | 10 | 1.35 | 0.06 | — | — | — | 310 | 92.3 | 81.0 | 74.8 |
| 23 | 4 | 1 | 1 | 3 | 9 | 1.35 | — | 0.1 | — | — | 300 | 93.5 | 84.9 | 79.3 |
| 24 | 4 | 1 | 1 | 3 | 9 | 1.35 | — | 0.5 | — | — | 345 | 92.2 | 83.7 | 77.1 |
| 25 | 4 | 1 | 1 | 2 | 10 | 1.5 | — | — | 0.02 | — | 315 | 93.3 | 83.1 | 77.5 |
| 26 | 4 | 1 | 1 | 2 | 10 | 1.5 | — | — | — | 0.02 | 320 | 93.5 | 81.0 | 75.7 |
| 27 | 4 | 1 | 1 | 2 | 10 | 2.0 | 0.1 | 0.05 | — | — | 330 | 93.5 | 82.0 | 77.4 |